W. W. CONNERS.
METHOD AND APPARATUS FOR INDICATING THE GEOGRAPHICAL LOCATION OR MOVEMENT OF BODIES.
APPLICATION FILED JUNE 12, 1919.
1,437,400.
Patented Dec. 5, 1922.
4 SHEETS—SHEET 1.
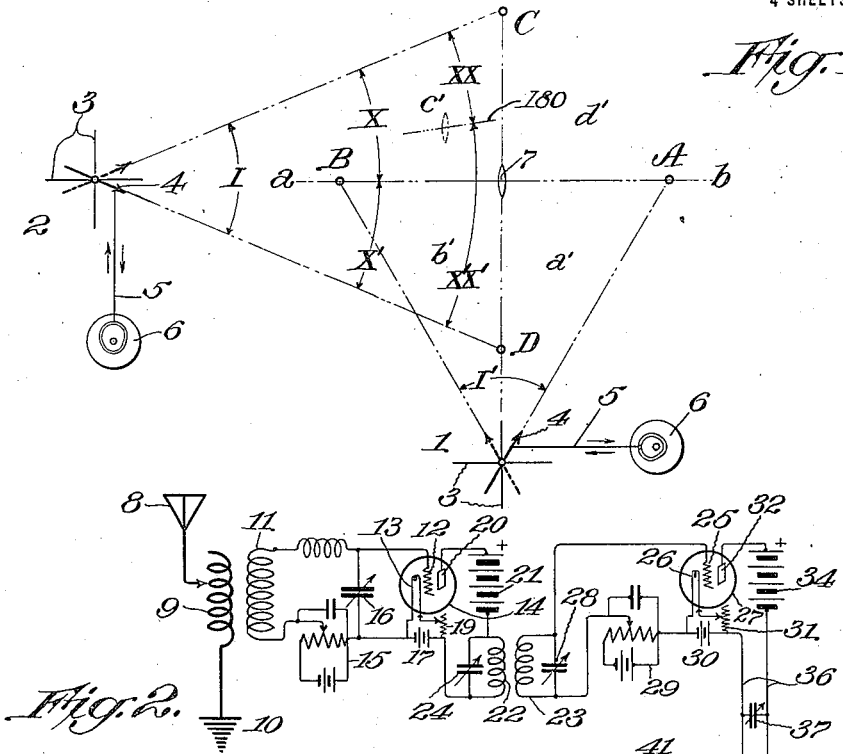
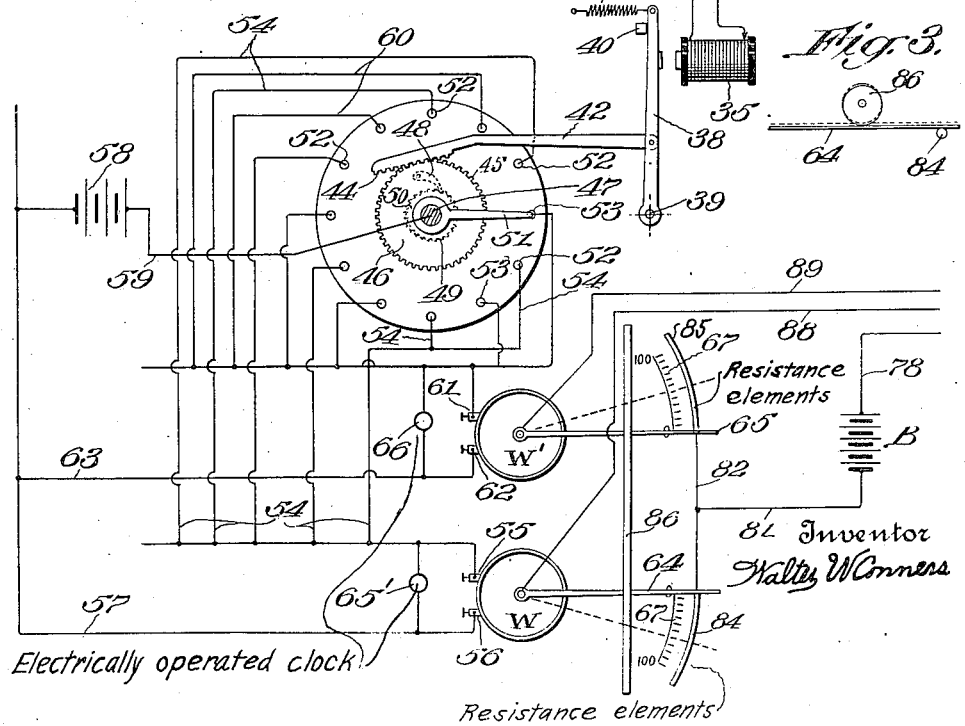

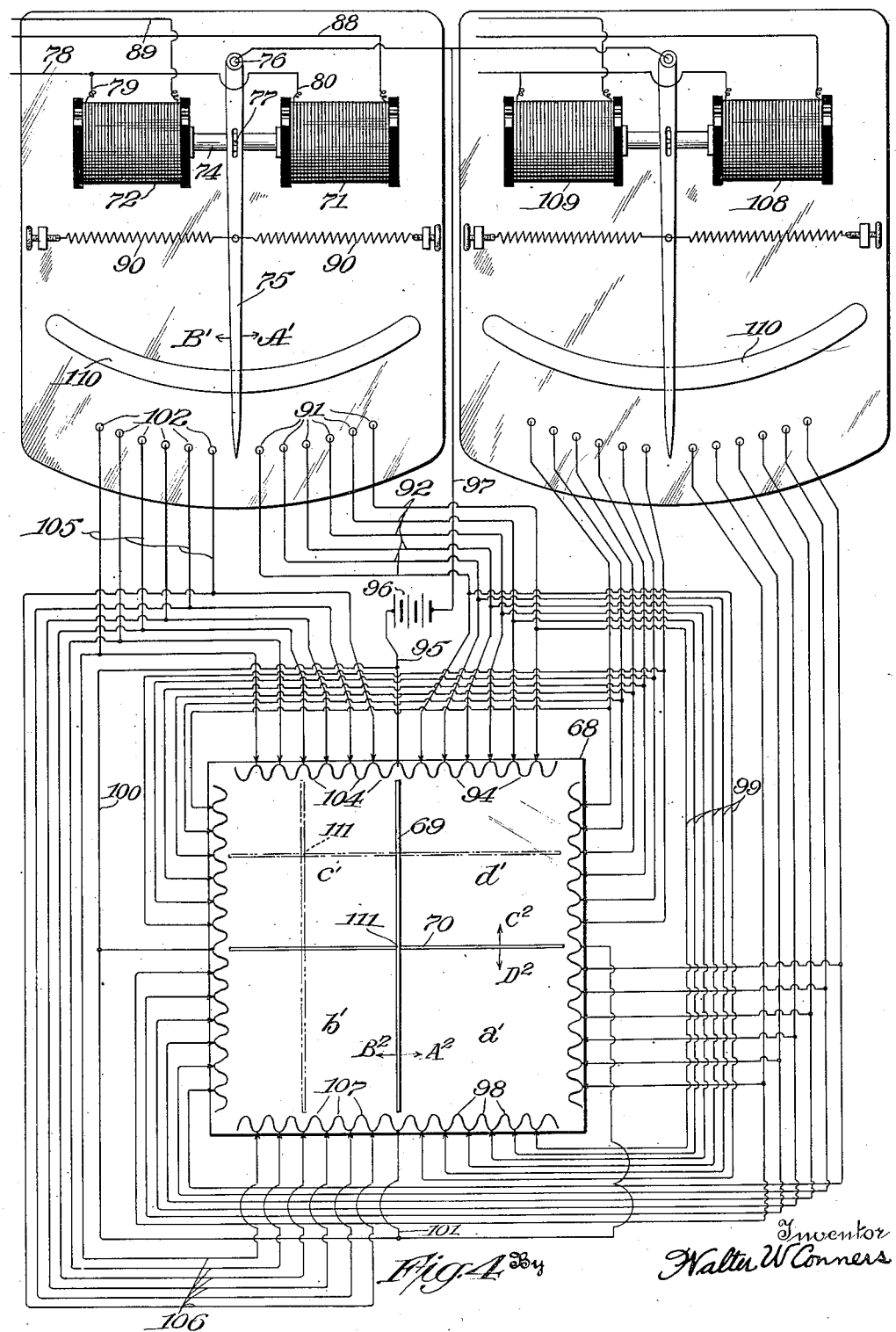

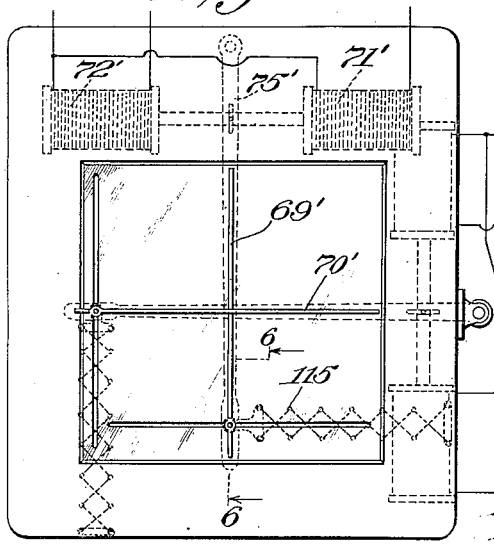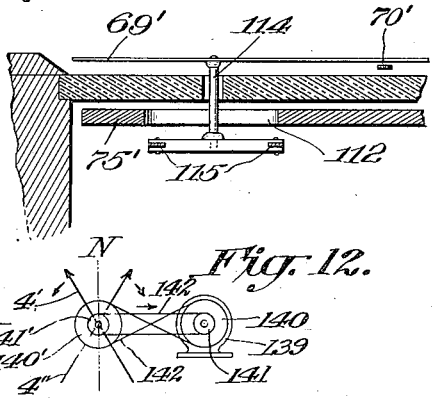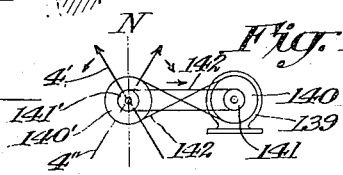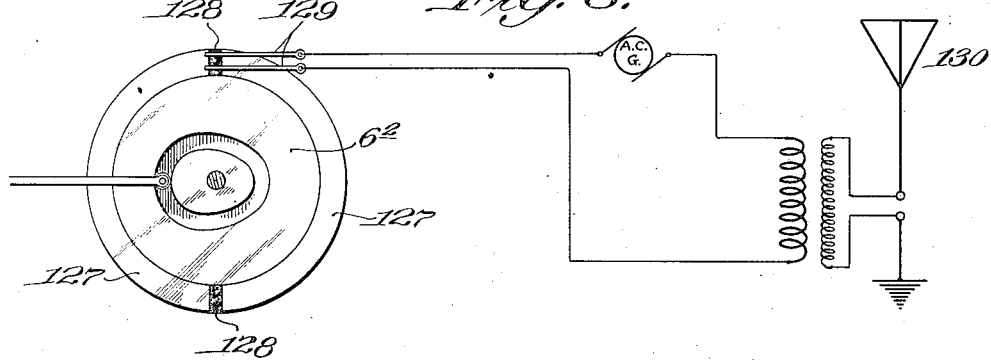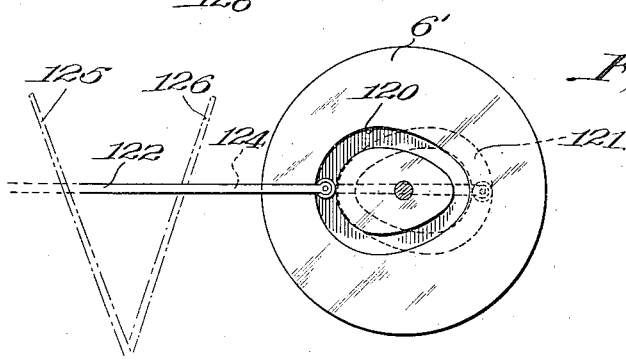

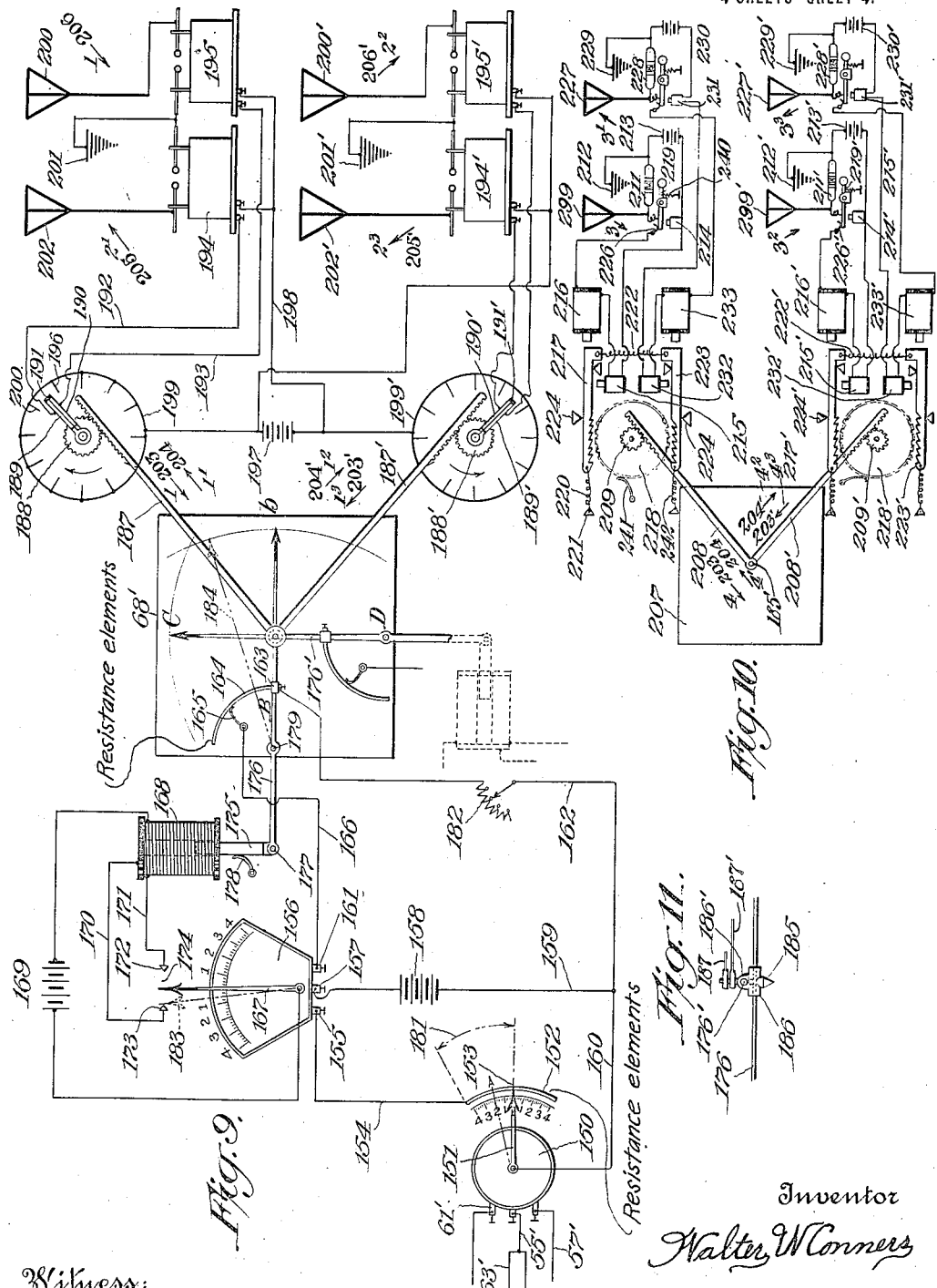

Patented Dec. 5, 1922.

1,437,400

UNITED STATES PATENT OFFICE.

WALTER W. CONNERS, OF ELIZABETH, NEW JERSEY.

METHOD AND APPARATUS FOR INDICATING THE GEOGRAPHICAL LOCATION OR MOVEMENT OF BODIES.

Application filed June 12, 1919. Serial No. 303,754.

*To all whom it may concern:*

Be it known that I, WALTER W. CONNERS, a citizen of the United States, residing at Elizabeth, in the county of Union and State of New Jersey, have invented certain new and useful Improvements in Methods and Apparatus for Indicating the Geographical Location or Movement of Bodies, of which the following is a specification.

My invention relates broadly to a method and apparatus for determining or indicating while on a moving or stationary body the location thereof by the use of directive radio transmitting apparatus either alone or in combination with uniform transmitting apparatus.

A further object of my invention is to indicate visually or intelligently or both the location and movement of a moving body in miniature or in similitude.

A further object of the present invention is to provide means for indicating in miniature, similitude, by time or by current ratio the position of a body with respect to a known point or points.

A further object is to reproduce the intelligence obtainable from the similitude box in other similitude boxes by means of intelligent signals.

Still another object of the present invention is to provide apparatus sensitive to radio impulses impressed thereon at intervals of time, capable of indicating or recording the position of a body by determining the time ratio between successive impulses.

Still another object of the present invention is to determine the relative location of a body to a known geographical point or points by measuring fractions of a known time.

The foregoing and other objects of the present invention, together with their attendant advantages, will be obvious as the invention becomes better understood by reference to the accompanying specification and drawings forming a part thereof, in which:

Figure 1 is a diagrammatic view showing the relative position of the transmitting stations employed.

Figure 2 is a diagrammatic view of a portion of the receiving apparatus mounted on the body, the position of which is to be determined.

Figure 3 is an enlarged detail view of a portion of the apparatus illustrated in Fig. 2.

Figure 4 is a diagrammatic view of a similitude indication device with operative connections therefor.

Figure 5 is a plan view of a modified form of similitude box.

Figure 6 is a sectional view of the construction illustrated in Fig. 5, the section being taken on the line 6—6 looking in the direction of the arrows.

Figure 7 is a view largely diagrammatic of a modified form of transmitting station.

Figure 8 is a diagrammatic view of still another form of transmitting station.

Figure 9 is a diagrammatic view showing a modified method with an intelligence transmitter attachment.

Figure 10 is a location duplicator similitude box.

Figure 11 is side view at intersection of indicator.

Figure 12 is another form of a modified transmitting station.

Other objects are brought out in the accompanying drawings and specifications.

Referring more particularly to the drawings, I have indicated transmitting stations 1 and 2 of the directive wave type which may employ stationary coils 3 and a movable coil 4. The movable coil of each station may be operated throughout a given arc by a reciprocating member 5 controlled by a cam 6 or the like. The range of movement of the movable coil of station 1 is such that at the extreme limits thereof it directs waves of maximum intensity toward known points A and B the distance between which has been previously ascertained. The directive transmitter 2, which is similar to the transmitter 1, is adapted to operate between the known points C and D. The movement of the coil of each directive transmitting apparatus is constant and uniform so that the time required to traverse the length of the arc having once been determined remains fixed. By reason of this construction it will be obvious that if a body, such for example as a vessel 7, is travelling between the known points, its position with relation thereto may be determined at any time by providing receiving apparatus tuned to respond to the directive waves when projected in line therewith.

Since the plane of the directed waves moves continuously, it will be apparent that by measuring the interval of time required for the waves to pass from the moving body to any of the known points, and then measuring the time required for the waves to pass from said body to any of the other known points and comparing said time periods, the relative distance of the vessel from said points may be determined.

For simplicity the term directive wave or directive beam or ray, will be used to indicate the line of maximum intensity of electromagnetic waves directed from an antenna and indicated on drawings by a light line, it being shown always as a line in plane of coil or arrow 4.

In Figure 2 I have illustrated diagrammatically a system of type commonly employed which may be used in connection with station 1 for receiving the radio impulses and amplifying the same, so that the energy transmitted may be made effective to operate suitable indicating or recording devices. This system preferably comprises a receiving aerial 8 in electrical connection with the primary 9 of a receiving tuner having a ground connection 10. The secondary coil 11 of the receiving circuit is in electrical connection with the grid 12 and filament 13 of a vacuum valve 14 through the regulating potentiometer 15 and shunt variable condenser 16. A local battery 17 is provided for heating the filament 13, the temperature of which may be regulated by the use of suitable resistance 19. The plate 20 of the vacuum valve is in electrical connection with the positive pole of the battery 21 through one coil 22 of a suitable radio frequency transmitter for cascade amplification of radio frequencies. A variable condenser 24 may be employed to tune the circuit through the coil 22 to resonance with the incoming oscillations. The radio or audio frequency component of the plate current of the valve 14 is impressed upon the grid 25 and filament 26 of a second valve 27 through the coil 23 of the radio frequency transformer. In the circuit of the valve 27 I preferably provide a variable condenser 28 for tuning the circuit to resonance, and a regulating potentiometer 29. A local battery 30 is in electrical connection with the filament 26 through the adjustable resistance 31; and the plate 32 is connected to the positive pole of a battery 34 as is usual in circuits of this nature.

The output of the second valve of the amplifier is employed to energize an electromagnet 35 through suitable connections 36. By properly adjusting the potentiometer 29, the effect of the incoming oscillations is to charge the variable condenser 37 in shunt with the electro-magnet, so that it in turn may discharge through the winding of the electro-magnet to energize the same. Upon energizing the electro-magnet 35 the armature 38, pivotally mounted at 39, is drawn away from the stop 40 against the action of the returning spring 41. Pivctally secured to the armature, in such manner as to be actuated thereby is an arm 42 preferably provided with gear or ratchet teeth 44 meshing with similar teeth 45 on the periphery of the disc 46 loosely mounted on a shaft 47. Operatively mounted on the disc 46 is a pawl 48 normally in engagement with ratchet teeth 49, on a second disc member 50 having mechanical connection to the switch arm 51. It will be apparent that movement of the armature 38 will produce a simultaneous movement of the switch arm 51, through the connections described.

The return movement of part 38 produces no effect on part 51. It is understood that the operating of the powerful magnet 35 by relatively weak energy obtainable from amplifying circuit is merely shown for simplicity as in actual practice magnet 35 may be a sensitive relay which controls a more powerful source of energy which in turn correspondingly operates armature 38.

A plurality of alternately arranged, equidistant contacts 52 and 53 are provided in such manner that they will be successively engaged by the switch arm 51 upon movement being imparted thereto. The contacts 52 are all connected through wires 54 to one of the terminals 55 of an ampere-hour meter W. The ampere hour meter circuit is completed through the terminal 56 and wire 57 to the battery 58 which is in electrical connection through the conductor 59 with the switch arm 51. The contacts 53 are similarly all connected by the wires 60 with one of the terminals 61 of a second ampere hour meter W', the circuit of which is completed through the opposite terminal 62 and conductor 63 with the battery 58. From the battery, connection is made with the contact with which the arm 51 is in engagement, through the connections described in referring to the contacts 52.

The ampere hour meters W and W' are so constructed that movement of the indicating needles 64 and 65 respectively is dependent upon the length of time during which the current flows there-through. This may be accomplished by employing wattmeters, ampere hour meters or galvanometers of the hot wire type, so that movement of the needle is dependent upon the heat energy and resulting elongation of a resistance member by the passage of current therethrough. I also preferably connect electrically operated clocks 65' and 66 of any well known construction in shunt with the ampere hour meters so that they will be operated for the same length of time only that current is supplied to the ampere hour meters.

Assuming that the movable coil 4 of the transmitter 1 is directing waves toward the body 7, and the receiving circuit energized to produce almost instantaneous movement of the switch arm 51 into engagement with a contact 53 as illustrated in the drawings, the coil 4 will now move to the extreme limit of its arc so that the waves transmitted therefrom are directed toward the known point B. It will immediately begin a return movement and will again energize the receiving circuit when the waves project toward the moving body. It will be obvious that during the time required for the wave to move from the body 7 to the point B and back, a current will have been flowing in the ampere hour meter W'. As soon, however, as the ray is picked up the second time by the receiving apparatus on board the body 7, the switch arm will be advanced into engagement with a contact 52 and will remain in this position until the ray has traveled from the body 7 to the point A and returned. During this time current will have been flowing continuously through the ampere hour meter W. This operation is repeated continuously, and as the time required for the ray to travel from the point A to the point B may be but a fraction of a second, it will be apparent that successive impulses are rapidly intermittently impressed upon the ampere hour meters, and that the movement of the needles thereof will be in proportion to the length of time required for the wave to complete its cycle of operation from the body to either of the known points and return to the body. This time ratio may be determined directly by observation of the electrically actuated clocks 65' and 66, or by employing calibrations 67 in conjunction with the ampere hour meter needles, so that the relative deflections thereof may be ascertained. If the body 7 is exactly midway between the points A and B, the deflection of the needles 64 and 65 will be equal, and the pilot will know that the vessel or body 7 occupies such a central position. If, on the other hand, the body 7 is nearer one of the known points or planes than the other, this may be determined by observing the time clocks or the relative amount of movement of the ampere hour meter needles, and calculating the distance from said ratio.

Since the body 7 may not be travelling in a straight line $a$—$b$ between the known points A and B, it may be desirable to employ simultaneously with the transmitting station 1 the second transmitting station 2 operating between the known points C and D. By employing transmitting stations of the directive wave type adapted to produce waves of different lengths, or having different frequencies, independent apparatuses, similar to that just described may be employed on board the body 7 tuned in such manner that each is effective only upon the reception of an impulse from the particular station with which it is in tune. By employing a second apparatus with the station 2, similar to the apparatus illustrated in Figure 2 for the station 1, the position of the vessel 7 with relation to the points C and D or said planes may be determined simultaneously with the indication of its position with respect to A and B or said planes. In this manner the exact location of the body at any time may be ascertained.

I preferably provide the transmitting stations at substantially right angles so that the area traversed thereby may be divided into sectors $a'$, $b'$, $c'$ and $d'$. In Figure 4 I have indicated a similitude box 68 having its upper surface divided into sectors $a'$ and so forth, corresponding to the sectors into which the area traversed by the transmitting stations is divided. If desired, the area of the similitude box may be divided to represent latitude and longitude. Cooperating with the similitude box for indicating or recording in miniature or similitude the position of the body 7. I employ magnetic needles 69 and 70 crossing at substantially right angles, the angle corresponding exactly to the angle of intersection of the chords of the arcs of the transmitting stations. The position of the needle 69 is controlled, as will be described hereinafter, by the electrical apparatus on the body 7 affected by the transmitting station 1, while the needle 70 is similarly controlled by the apparatus affected by the transmitting station 2.

Adjustment of the needle 69 to indicate the position of the body 7 is directly secured by the action of a pair of oppositely wound solenoids 71 and 72 having a movable core 74 for swinging the needle 75 having a pivotal mounting 76. Connection between the core and the needle may be in the form of a pin and slot connection 77. A suitable source of current B is connected by the wire 78 with one of the windings of each of the solenoids 71 and 72 through the connectors 79 and 80 respectively. The opposite side of the battery is in electrical connection through the wire 81 with a conducting bar 82, the opposite ends of which are suitably secured to resistance bars 84 and 85. The resistance bar 84 is arranged in arcuate form to cooperate with the needle 64 of the wattmeter W, while the resistance 85 is similarly arranged to cooperate with the needle 65 of the ampere hour meter W'. The needles 64 and 65 are normally out of engagement with the resistance bars, but are intermittently forced into engagement therewith by the action of a rotating eccentric 86, illustrated in detail in Figure 3 of the drawings. The eccentric may be driven in any desired manner and at any desirable speed. When the needle 64 is in engagement with the resistance bar 84, the battery circuit B will be completed through the needle and conductor 88 with the solenoid 71. In like manner when the needle 65 of the ampere hour meter W' is in engagement with the resistance 85, the battery circuit B will be completed through the needle and conductor 89 with the solenoid 72. The solenoids 71 and 72 are oppositely wound and of equal strength. It will be apparent that the magnetic field of each of the solenoids, and the consequent movement of the core bar 74 will therefore be dependent upon the amount of current supplied to the windings. This current is varied in accordance with the positions the needles 64 and 65 occupy with respect to the resistance bars 84 and 85. If the amount of deflection at a given instant of the needles of the ampere hour meters is the same, the amount of resistance interposed in the circuit of each of the solenoids will be the same, and consequently the magnetic field of each will be the same. Since the solenoids operate in opposition one to the other, there will be no movement of the needle 75, it resting in midwise position. On the other hand, if the relative deflection of the needles of the ampere hour meters is different, there will be a resulting deflection of the needle 75 in one direction or the other against the action of the springs 90. The amount of this deflection will depend upon the difference in the amounts of resistance interposed in the circuits of the ampere hour meter needles.

From the foregoing description, it will be understood that the circuits are so arranged that if the body 7 is nearer the point A than it is to the point B, there will be a deflection of the needle 75 in the direction of the arrow A', while if the body 7 is nearer the point B, the movement of the needle will be in the direction of the arrow B'. Movement of the needle 69 in the direction of the arrow $A^2$ is secured when the needle 75 swings in the direction indicated by the arrow A' by providing a series of any desired number of contacts 91 each having a separate connection 92 to one of the coils of a helix 94. The circuit of the helix is completed through the wire 95, battery 96 and wire 97 with the solenoid needle. A second helix 98 has its coils similarly connected to the contacts 91 through conductors 99 joined to the respective wires 92. The helix 98 is in circuit with the battery through wire 100 and connector 101. The helix 94 may be so wound that a series of south poles will be successively produced at gradually increasing distances from the center line of the similitude box as the contacts 91 are successively engaged. In like manner the helix 98 may be wound so that a series of north poles are established progressively at increasing distances from the center line of the similitude box as the contacts 91 are successively engaged. If the needle 69 is magnetized so that a north pole is produced at the end cooperating with the helix 94 and a south pole cooperating with the helix 98, it will be apparent that the needle will be moved varying distances dependent upon the relative movement of the needle 75. The opposite side of the similitude box is controlled by contacts 102 having connection with a helix 104 through conductors 105. Branch conductors 106 are joined to a second helix 107. In this manner movement of the needle 69 in one direction or the other may be produced in exact accordance with the location of the moving body 7 with respect to either of the points A or B or to correspond with plane between ship and transmitting station.

Where a second transmitting station 2 is employed in conjunction with the transmitting station 1, I preferably provide a second pair of solenoids 108 and 109 similar in construction to the solenoids 71 and 72 just described. The solenoids 108 and 109 operate to produce movement of the magnetic needle 70 in the direction of arrows $C^2$ and $D^2$ through connections similar to those described with reference to the needle 69. In order that the movements of the solenoid needles will be relatively slow I may provide magnetic drags 110 which magnetically oppose movement thereof. This will insure sufficient duration of contact between the needles and the contact points to produce the desired movement of the magnetized needles.

Since the movement of each of the magnetized needles 69 and 70 is directly dependent upon the position of the moving body or said plane, it will be apparent that their point of intersection 111 will always indicate the position of the body. If the surface of the similitude box is divided into latitude and longitude, the position of the body will be definitely indicated.

In Figure 5 I have illustrated one form of similitude box which may be employed in practice. This construction embodies solenoids 71' and 72' operating the needle 75'. This needle is provided with a slot 112 through which passes a pin 114 having connection with needle 69' corresponding to needle 69. Due to this construction, the needle 69' will be moved directly by the needle 75'. This movement may be assisted in a straight line by controlling the pin 114 with lazy tongs 115. A second duplicate apparatus may be employed in connection therewith where two transmitting stations are utilized. The second apparatus, when so employed, will be identical in operation and construction with the apparatus referred to so that it is believed to be unnecessary to refer thereto in detail. This second apparatus is indicated in Figure 5 which clearly shows the pointers 69' and 70' travelling in straight lines and intersecting to denote the location of the body 7.

In Figure 7 I have indicated a double cam 6' having grooves 120 and 121 on its opposite faces for controlling the reciprocation of arms 122 and 124 respectively. These arms may be connected in any desired manner to operate the moving coils 125 and 126 of directive transmitting stations. The arrangement is such that the coils will constantly move in opposite directions. The use of an apparatus of this type will be similar to the use of the apparatus before referred to, incidentally the coinciding of the planes designates a known plane or direction.

I have indicated a motor 139 which operates two pulleys or the like, 140 and 141 which by means of belts or the like rotates pulleys 140 and 141' in opposite directions; coils 4 and 4' rotating one with pulley 141 and other side with pulley 140'; operation being to determine the direction of ship from transmitting station by measuring the intervals of time between reception of said directive beams.

In Figure 8 I have illustrated still another modification of transmitting station adapted to employ a transmitter of the directive wave type simultaneously with a transmitter of uniform wave type. A cam $6^2$ may be employed for operating the movable coil of the directive transmitting station. This cam may have arranged on its periphery conducting plates 127 separated by blocks 128 of insulating material. Cooperating with the conducting plates 127 is illustrated a pair of brushes 129 in circuit with a uniformly radiating transmitting station 130. The conducting plates are so arranged that when the cam $6^2$ is in such a position that the movable coil of the transmitting station is in either extreme of its arc of movement, the brushes 129 will cooperate with one of the blocks of insulation material. Throughout the remainder of the operation of the cam $6^2$ the brushes will contact with one of the conducting plates and close the circuit of the uniform transmitting station. Due to this construction, a uniform wave will be radiated throughout the length of time the directive wave is travelling from one of the known points to the other, but will be stopped at the instant the directive wave points toward either of said known points. The wave length of the uniform wave transmitting station 130 may be such that it may be received independently of the directive waves. The advantage of a dual transmitting station of this type resides in the fact that it is possible for the operator on board the moving body to measure definitely the length of time required for the travel of the directive wave. This total time may be then compared to the times required for the directive wave to complete its movement from the body to either of the known points or planes and return and the distances of the body from said points definitely calculated by the time ratio.

A further object is to indicate in similitude the location and movement of said adjunct objects or to indicate same in intelligence signals or other moving bodies or at other locations.

Referring to Figure 9 the operating means of the location indicator will be described in a modified form more suitable to perform the functions required of it. The ampere hour meter 150 or other means the index of which may indicate the relative ratio of the quantity of electricity that is flowing or has flowed may operate on principle of energy times time equals indication. Said ampere hour meter 150 is used in place of meters W and W' see Figure 2. In this case the conductor 63 and the final conductor 57 being connected to same terminal of meter 150 designated as 55', in this case only one need be used. Terminal 61' corresponds to conductor or terminal 61, the third terminal and conductor 57' corresponds to terminal 55 and conductors 54 the said circuits functionating exactly the same as above described.

Indicating hand 151 rests in position shown when the total energy flowing in both said meter circuits is equal through a certain interval of time. If the said energy is not equal the hand 151 moves in say the direction of the side having the strongest current, indicating the ratio of the currents as described. The hand 151 may be in movable electrical contact at 153 with the resistance bar 152 the function of which will be described later.

Conductor 154 connecting one end of bar 152 to terminal 155 of balance meter 156 the center terminal 157 of which is connected by a conductor to one terminal of battery 158 or the like which is in series with hand 151 as shown through conductors 159 and 160. The third terminal 161 is likewise in series with battery 158 through conductors 166, 159, 162, rheostat 182, resistance bar 164 and brush 165. The resistance of the aforesaid circuits should be equal when in position shown. This can be accomplished by regulating rheostat 182, thus the said current will flow equally through said circuits and hand 167 of meter 156 will rest in position shown, said meter being preferably of the type used to indicate relation of current in a Wheatstone balance.

However should the resistance of either said circuits of battery 158 be varied the current in circuit in question would likewise vary, moving the hand 167 towards the circuit having greatest current or least resistance; thus closing a switch 174 causing a solenoid 168 or the like, to operate. This may be accomplished by means of a battery or current source 169, one terminal of which is connected to hand or switch 167, the other terminal being connected to one winding of solenoid 168 which is in series with conductor 170 and contact 173 of switch 174. The said conductor extending from battery 169 to solenoid 168 is likewise connected to a reverse winding on solenoid 168 which is in series with conductor 171 connecting to contact 172 of said switch. The armature 175 of the solenoid 168 is pivoted to a similitude beam 176 at 177, which is in turn pivoted to similitude box 68' in geographical similitude at 179; attached to said similitude beam at 163 is a curved resistance bar 164 which is in series with conductors 162 and 166 through brush 165.

Referring to 4 in Figure 1, it is evident that if the directive beam of station 2 moves from C to D and D to C at constant angular speed, the intervals of time it required for the beam to travel from C to location 7 and 7 to D are equal, it being understood ship 7 is located somewhere in a radio plane with angles $x$ and $x'$ equal. This is shown as line B and A. If however, the body in question was located at say position C' it is evident that the ship would be somewhere in radio plane 180 determined by X X and X' X'. This plane could be located by comparing the intervals of time between the indications effected on the ship 7 every time the directive beam sweeps across its receiver. For example it will be considered that the plane of the directive beam 4 requires 18 seconds to move from plane 180 to side C, then to side D and back to plane 180; the first interval being 6 seconds and second interval being 12 seconds, by proportion angle X' X' is twice angle X X and for example if angle I equals 30°, angle X X=10° and angle X' X'=20°, the angles being in proportion to each other as said intervals of time are to each other. In actual practice it is understood allowance is made for actual time required to reverse the directive beam, which being equal at each reversal, does not affect the principle. By using another similar transmitting station say located as shown 3 in Figure 1, the plane of the ship to this station could likewise be determined in its relation to angle I' thus exactly locating ship C', stations 2 and 3 being known points and the angles I and I' being predetermined movements.

Referring to similitude box 68' Figure 9 the similitude beam 176 corresponds to directive beam 4 Figure 1 when in position of pointing towards ship 7 and as said before when angle X=X' the indicator of the ampere hour meter should be midwise as shown, as said circuits are equal; thus including in its circuit of the battery 158 a portion 181 of the resistance bar 152. It is now evident from the foregoing that if the portion of the resistance 164 included in the other said circuit of battery 158 between 163 and brush 165 exactly equals 181, the hand 167 will be in position shown.

Now if the ship 7 is located at C' the hand 151 would move to a position indicated by dotted line and arrow, thus increasing the flow of current from battery 158 which in turn causes hand 167 to move to position 183 closing the switch 173 and causing current from battery 169 to flow through battery circuit 170 which action in 168 tends to expel armature 175, which in turn moves 176 to position 184 which corresponds to 180 Figure 1, it being understood that the resistance bars 152 and 164 are so related to each other that the portion of resistance bars 164 in circuit when part 176 is in position 184 balances the two said battery circuits, causing hand 167 to resume its position of rest, thus breaking battery circuit 169 which causes part 176 to stop at position of 184. The drag 178 tends to hold part 176 in correct position. If ship 7 moves in opposite direction to C' the reverse of the above would take place or the hand 151 would move downward corresponding to movement of ship from midwise position, which would as above described move hand 167 against contact 172 which causes armature 175 to be drawn into part 168 which in turn increases portion of 164 in circuit again balancing said circuits at the position where part 163 corresponds to radio plane of position of ship 7 wherever it may be located.

By providing a second apparatus which may be identical with apparatus just described for station 1 Figure 1, which would operate directive beam pointer 176', it is self evident the point of intersection of 176 and 176' is position of ship 7 in miniature or in similitude.

By slideably mounting on directive pointer beam 176 at point of intersection with beam 176' a bushing 186 (see Figure 11) and likewise a bushing 186' on 176' in pivoted relation to each other, with an indicator 185 which may be a pencil or the like, it is evident the location of this indicator will show the location of the ship 7.

Pivoted on the center line and moving with said indicator are the ratchet arms 187 and 187' which at opposite ends engage with gears 188 and 188' respectively, which in turn rotate brushes 190, 189 and 190' and 189' respectively which are insulated from each other by insulation 191 and 191'. Brush 189 is connected to one terminal of an induction coil 194 by means of conductor 192, the other terminal of which is connected in series with a battery 197 and collector ring 199 as shown. Brush 190 is likewise connected to one terminal of induction coil 195, by means of conductor 193, the other terminal of which is also in series with battery 197 and collector ring 199' by means of a conductor 198 as shown.

When the indicator 185 moves ratchet arm 187 in the general direction indicated by arrow 203 brush 190 closes a circuit by coming in contact with brush 196, which operates transmitting station indicated by corresponding arrow 206. Likewise when indicator of 185 moves arm 187 in general direction of arrow 204 brush 189 comes in contact with a brush 200 (similar to 196) causing transmitting station indicated by corresponding arrow 205 to operate. The transmitting stations 205 to 206 are shown in fundamental diagram for sake of simplicity of description. In general 202 and 200 are antennæ connected to a ground 201 through induction coils 194 and 195 respectively.

In a like manner movement of ratchet arm 187' in general direction indicated by arrow 203' causes station 205' to be operated and when moved in the reverse indicated by arrow 204' causes station 206' to be operated.

In the duplicate similitude box 207 any movement of the indicator 185 or likewise of the ship will be relatively reproduced. The box 207 may likewise be a map in miniature of the zone being traversed by the body, the location and movement of which is desired to be indicated in similitude on 207 wherever it may be located; the box 207 has a ratchet arm 208 extending to gear 209 which corresponds to 187 and 188 respectively. Antenna 299 is tuned to respond to waves which are radiated by antenna 200 when brushes 190 and 196 are in contact (see arrow 203) thus operating coherer 211 or the like in usual manner, closing battery circuit 213 energizing magnets 215 and 216, magnet 215 draws ratchet arm 217 into mesh with gear 218 as magnet 216 draws said arm towards itself, thus rotating gear 218 a predetermined distance corresponding to the relative movement of part 187 between contacts 196, likewise relatively moving arm 208 in direction 203, corresponding to movement of arm 187. Gear 209 rotates with gears 218 and in mesh with arm 208. Magnet 214 attracts armature 219 thus striking coherer 211. As this breaks the battery circuit 219 at spring contact 226 the armature 219 is returned to its original position by a return spring 240, this process being continuous as long as said waves are being received through coherer. As this interruption may be very rapid only one movement of ratchet arm 217 is caused by reception of a train of waves. When brushes 190 and 196 pass out of contact the antenna 200 ceases radiating waves. Thus coherer 211 is decohered breaking battery circuit 219, the arm 217 being returned by return spring 220 secured at 221. Spring 222 normally holds ratchet arms 217 and 223 against the stops 224 out of engagement with gear 218. Drag or stop 241 holds gear 218 in correct position and keeps it from turning upon the return of arms 217 and 223.

If ratchet 187 is moved in direction 204 brushes 189 and 200 (same as 196) as above described cause antenna 202 to radiate waves which are received on antenna 227 operating coherer 228 which closes battery circuit 230 energizing magnets 233 and 232 and operating decoherer 231 similar to decoherer 214. Magnet 232 draws ratchet arm 223 into contact with said gear 218 and magnet 233 attracts ratchet arm 223 thus rotating gear 218 a predetermined distance in an opposite direction to first described movement, similarly moving arm 208 a corresponding distance. Likewise when brushes 189 and 200 open contact the decoherer 231 breaks battery circuit 230 and ratchet arm 223 is returned to its position of rest as shown by return springs 222 and 242.

It is evident that movements of arm 187' will likewise cause antennæ 202' and 200' to radiate waves, as antenna 209' is tuned to receive the waves radiated from antenna 200', and antenna 227' is tuned to receive the waves from antenna 202' the operation of which is exactly the same as above described making it unnecessary to describe it further. However for ease in understanding I have placed an arrow and numbers beside every antenna and arms 187, 187', 208, 208' the angular direction of arrow and numbers indicate the relation and order of function. It is understood that all transmitting stations are tuned to radiate waves of such character that they will operate only the intended receiver. The entire reproduction apparatus is shown as diagrammatically and fundamentally as possible for the sake of clearness of description, it being understood that it is not necessary to use a separate transmitting station and receiving station for each function as is described.

In general as the indicator 185 moves across the map it causes a definite number of signals or impulses to be radiated from the four transmitting stations the number radiating from each station depending upon the particular movement of said indicator. The said radiated waves may be detected anywhere by any suitable apparatus and when deciphered would indicate the geographical location of said moving body.

If they are used to operate the similitude box 207 by means of described apparatus the indicator 185' may move over a similar map of the zone being traversed by the moving body, thus indicating in miniature and similitude the location and movement of said body and all adjuncts.

What I claim is:

1. The method of determining the direction of a body with relation to a known point, which consists of uniformly oscillating a directive radio wave over a known arc including said body and indicating the intervals of time between said wave reception on said body.

2. The method of determining the position of a body with relation to known points between which the body lies which consists in moving a directive radio wave back and forth between said points at a predetermined speed, and indicating the relative times required for said wave to travel the distance between one of said points and the body, and between the other of said points and the body.

3. The method of determining the location of a body with relation to known points between which it lies, which consists in moving a directive radio wave back and forth between said points at a constant speed so that the wave intercepts said body at intervals of time dependent on the distance of said body from said points, and determining the distance from said time intervals.

4. The method of determining the location of a body with relation to known points between which it lies, which consists in moving a directive radio wave back and forth between said points at a constant speed so that the wave intercepts the body at intervals of time dependent on the distance of said body from said points, indicating said time intervals and determining the distance from said intervals.

5. The method of determining the position of a body with respect to known points between which it lies, which consists in moving a directive radio wave back and forth between said points at a predetermined speed so that the wave intercepts said body at intervals of time dependent on the distance of said body from said points, and indicating in similitude the position of said body.

6. The method of determining the location of a body with relation to a plurality of points between which it lies, which consists in moving a plurality of directive radio waves back and forth between said points at predetermined speeds so that the waves intercept said body at intervals of time dependent on the distance of the body from said points, and determining the location from said intervals.

7. The method of indicating in similitude the location of a body with relation to known points between which it lies, which consists in moving a radio wave back and forth between said points at a predetermined speed so that the wave intercepts said body at intervals of time dependent on the distance of said body from said points, and producing a movement of suitable indicating mechanism in accordance with said time intervals.

8. The method of determining the location of a body with relation to known points between which it lies, which consists in actuating indicating mechanism on said body intermittently at intervals of time dependent on the distance of said body from said points, and determining the distance from said time intervals.

9. The method of determining the location of a body with relation to a plurality of known points between which it lies, which consists in subjecting mechanisms on said body to impulses to which they are sensitive at intervals of time dependent on the distance of said body from said points, and determining the distance from said time intervals.

10. An apparatus for determining on a body the location of said body with relation to known points between which it lies, comprising a directive wave transmitting station, means for moving the wave at a predetermined speed back and forth between said points so that the wave intercepts the body at intervals of time dependent on its distance from said points, means on said body adapted to be actuated by said wave each time it intercepts the body, and indicating mechanism controlled by said means.

11. An apparatus for determining on a body the location of said body with relation to known points between which it lies, comprising a directive wave transmitting station, means for moving the wave at a predetermined speed between said points so that the wave intercepts the body at intervals of time dependent on its distance from said points, means on said body adapted to be actuated by said wave each time it intercepts the body, and mechanism controlled by said means for indicating in similitude the location of said body.

12. An apparatus for determining on a body the location of said body with relation to a plurality of known points between which it lies, comprising a plurality of directive wave transmitting stations each producing distinctive waves, means for moving said waves at predetermined speeds back and forth between said points so that the body is intercepted intermittently by said waves at intervals of time dependent on its distance from said points, separate means on the body sensitive to each of the waves and adapted to be actuated thereby each time they intercept the body, and indicating mechanism controlled by said means.

13. An apparatus for indicating in similitude on a body the location of said body with relation to known points between which it lies, comprising a chart, a plurality of angularly arranged needles co-operating therewith and indicating the location of said body with their point of intersection, and means for producing movement of said needles in proportion to the movement of said body.

14. An apparatus for indicating in similitude on a moving body the location of said body with relation to known angles within which it lies, comprising a chart, a plurality of angularly arranged pointers co-operating therewith and indicating the location of said body with their point of intersection, and means for reproducing movement of said body in similitude at point of intersection of said pointers.

15. An apparatus composed of a plurality of known located transmitting stations, a responsively equipped receiving means and a representation of said transmitting stations placed on board a moving body, an indicator in conjunction with said representation so operated by said receiving means that it automatically indicates the relative location of said body to the said transmitting stations.

16. In combination, means for transmitting radiant energy over a designated area, a body movable in said area, means on said body responsive to said energy for indicating the location of said body in said area, and means on said body responsive to said indicating means for emitting radiant energy signals indicative of the position of the said body.

17. In combination means for transmitting radiant energy over a designated area, a body movable in said area, means on said body responsive to said energy for indicating the location of said body in said area, means on said body responsive to said indicating means for emitting radiant energy geographically indicative of the position of the said body, and means actuated by the latter said energy for reproducing the said location at another point.

18. In combination, means for transmitting radiant energy into a designated space, a body movable in said space, and means on said body responsive to said energy for emitting signals geographically indicative of the location of the body in said space.

In testimony whereof I affix my signature.

WALTER W. CONNERS.